(12) United States Patent
Qi (10) Patent No.: US 7,299,355 B2
(45) Date of Patent: Nov. 20, 2007

(54) FAST SHA1 IMPLEMENTATION

(75) Inventor: Zheng Qi, Milpitas, CA (US)

(73) Assignee: Broadcom Corporation, Irvine, CA (US)

(*) Notice: Subject to any disclaimer, the term of this patent is extended or adjusted under 35 U.S.C. 154(b) by 759 days.

(21) Appl. No.: 10/042,019

(22) Filed: Jan. 8, 2002

(65) Prior Publication Data

US 2002/0184498 A1  Dec. 5, 2002

Related U.S. Application Data (60) Provisional application No. 60/261,425, filed on Jan. 12, 2001.

(51) Int. Cl.
*H04L 9/00* (2006.01)
*H04K 1/00* (2006.01)

(52) U.S. Cl. .................. 713/168; 380/28; 380/30; 380/229; 380/232; 708/710; 708/711; 708/712; 708/252

(58) Field of Classification Search .............. 713/200, 713/168; 380/28, 30, 229, 232; 708/710, 708/711, 712, 524, 252
See application file for complete search history.

(56) References Cited

U.S. PATENT DOCUMENTS

| | | | |
|---|---|---|---|
| 5,276,635 A * | 1/1994 | Naini et al. ............. | 708/713 |
| 5,297,206 A | 3/1994 | Orton | |
| 5,299,319 A * | 3/1994 | Vassiliadis et al. ...... | 712/221 |
| 5,375,081 A * | 12/1994 | Anderson ................ | 708/712 |
| 5,548,544 A * | 8/1996 | Matheny et al. .......... | 708/497 |
| 5,796,836 A | 8/1998 | Markham | |
| 5,870,474 A | 2/1999 | Wasilewski et al. | |
| 5,877,973 A * | 3/1999 | Kato et al. ............. | 708/711 |
| 5,936,967 A | 8/1999 | Baldwin et al. | |
| 5,940,877 A * | 8/1999 | Eickemeyer et al. ....... | 711/220 |

(Continued)

FOREIGN PATENT DOCUMENTS

WO    WO 01/80483 A    10/2001

OTHER PUBLICATIONS

Sait, S.M.; Farooqui, A.A.; Beckhoff, G.F.; A novel technique for fast multiplication, Computers and Communications, Conference Proceedings of the 1995 IEEE Fourteenth Annual International Phoenix Conference on Mar. 28-31, 1995 pp. 109-114.*

(Continued)

*Primary Examiner*—Nasser Moazzami
*Assistant Examiner*—Carl Colin
(74) *Attorney, Agent, or Firm*—Sterne Kessler Goldstein & Fox, P.L.L.C.

(57) ABSTRACT

Provided is an architecture (hardware implementation) for an authentication engine to increase the speed at which SHA1 multi-loop and/or multi-round authentication algorithms may be performed on data packets transmitted over a computer network. As described in this application, the invention has particular application to the variant of the SHA1 authentication algorithms specified by the IPSec cryptography standard. In accordance with the IPSec standard, the invention may be used in conjunction with data encryption/encryption architecture and protocols. However it is also suitable for use in conjunction with other non-IPSec cryptography algorithms, and for applications in which encryption/decryption is not conducted (in IPSec or not) and where it is purely authentication that is accelerated. Among other advantages, an authentication engine in accordance with the present invention provides improved performance with regard to the processing of short data packets.

24 Claims, 10 Drawing Sheets

U.S. PATENT DOCUMENTS

| | | | |
|---|---|---|---|
| 5,943,338 | A | 8/1999 | Duclose et al. |
| 5,951,631 | A * | 9/1999 | Hwang .................... 708/710 |
| 6,111,858 | A | 8/2000 | Greaves et al. |
| 6,216,167 | B1 | 4/2001 | Momirov |
| 6,304,657 | B1 * | 10/2001 | Yokota et al. ............... 380/28 |
| 6,334,190 | B1 * | 12/2001 | Silverbrook et al. ........ 713/500 |
| 2001/0021253 | A1 * | 9/2001 | Furuya et al. ............. 380/259 |
| 2003/0145033 | A1 * | 7/2003 | Bradley et al. ............ 708/710 |

OTHER PUBLICATIONS

Hao-Yung Lo; Sha-Fen Ling; Chun-Ming Shie; A high-speed of self-timing carry-completion for direct two's complement multipliers, Circuits and Systems IEEE APCCAS 1998. The 1998 IEEE Asia-Pacific Conference on Nov. 24-27, 1998 pp. 643-646.*

Ragab, A.H.M.; Ismail, N.A.; Allah, O.S.F.; An efficient message digest algorithm (MD) for data security, Electrical and Electronic Technology, TENCON. Proceedings of IEEE Region 10 international Conference on vol. 1, Aug. 19-22, 2001 pp. 191-197.*

Deepakumara, J.; Heys, H.M.; Venkatesan, R.; FPGA implementation of MD5 hash algorithm Electrical and Computer Engineering, 2001. Canadian Conference on May 13-16, 2001 pp. 919-924 vol. 2.*

Yong Kyu Kang, Dae Won Kim, Taek Won Kwon, and Jun Rim Choi; "An Efficient Implementation of Hash Function Processor for IPSEC"; ACM 2000; pp. 1-4.*

Ravichandran Ramachandran and Shih-Lien Lu; "Carry Logic"; 1999 by John Wiley & Sons, Inc; pp. 49-54.*

"Applied Cryptography, Second Edition", Schneider, B., 1996, John Wiley & Sons, New York, XP002184521, cited in the application, p. 442, paragraph 18.7—p. 445.

"SHA: The Secure Hash Algorithm Putting Message Digests to Work", Stallings, W., Dr. Dobbs Journal, Redwood City, CA, Apr. 1, 1994, p. 32-34, XP000570561.

Schneier B, "Applied Cryptography, Second Edition", 1996, John Wiley & Sons, New York US XP002184521, pp. 436-445.

Stallings W., "SHA: The Secure Hash Algorithm Putting Message Digests to Work", Dr. Dobbs Journal, Redwood City, CA, US, Apr. 1, 1994, XP00570561, p. 32-33.

Analog Devices: "ADSP2141 SafeNetDPS User's Manual, Revision 6" Analog Devices Technical Specifications, Mar. 2000, XP002163401, 87 Pages.

C. Madson, R. Glenn: "RFC 2403- The Use of HMAC-MD5-96 within ESP and AH", IETF Request for Comments, Nov. 1998, XP002163402, Retrieved from Internet on Mar. 20, 2001, http://www.faqs.org/rfcs/frc2403.html, 87 Pages.

S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 5 Pages.

Keromytis, et al., "Implementing IPsec", Global Telecommunications Conference (Globecom), IEEE, Nov. 3, 1997, pp. 1948-1952.

Pierson, et al., "Context-Agile Encryption for High Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 470-474.

Smirni, et al., "Evaluation of Multiprocessor Allocation Policies," Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposium on VLSI, Mar. 4-6, 1999, pp. 325-328.

Analog Devices: "Analog Devices and IRE Announce First DSP-Based Internet Security System-On-A-Chip", Analog Devices Press Release, Online, Jan. 19, 1999, pp. 1-3. http://content.analog.com/pressrelease/prdisplay/0,1622,16,00.html.

3Com: "3Com Launces New Era of Network Connectivity", 3Com Press Release, Jun. 14, 1999, pp. 1-3.

"Secure Products VMS115", VLSI Technology, Inc., Printed in USA, Document Control: VMS115, VI, 0, Jan. 99, pp. 1-2.

"VMS115 Data Sheet", VLSI Technology, Inc., a subsidiary of Philips Semiconductors, Revision 2:3, Aug. 10, 1999, pp. 1-64.

"Data Sheet 7751 Encryption Processor", Network Security Processors, Jun. 1999, pp. 1-84.

Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G. S., et al., "Microsoft Point-To-Point Encryption (MPPE) Protocol", Microsoft Corporation, Network Working Group, Internet Draft, Oct. 1999, pp. 1-12.

Deutsch, P., "DEFLATE Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., et al., "IP Encapsulating Security Payload (ESP)", Network Working Group, Nov. 1998, pp. 1-22.

Maughan, D, et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Network Working Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

"Compression for Broadband Data Communications", BlueSteel Networks, Inc., Sep. 8, 1999, pp. 1-9.

"Securing and Accelerating e-Commerce Transactions", BlueSteel Networks, Inc., Revision 2.0, Oct. 20, 1999, pp. 1-7.

"Securing Broadband Communications" BlueSteel Networks, Inc., Sep. 8, 1999, pp. 1-10.

R. Sedgewick, "Algorithms in C—Third Edition", 1998, Addison Wesley XP002163543, pp. 573-608.

* cited by examiner

FIG. 8 add5to1

FIG. 9A add4to1

FAST SHA1 IMPLEMENTATION

CROSS-REFERENCE TO RELATED APPLICATIONS

This application claims priority under 35 U.S.C. §119(e) from U.S. Provisional Application No. 60/261,425, entitled UBIQUITOUS BROADBAND SECURITY CHIP, filed Jan. 12, 2001, the disclosure of which is herein incorporated by reference herein for all purposes.

BACKGROUND OF THE INVENTION

1. Field of the Invention

The present invention relates generally to the field of message authentication, and more specifically to an authentication implementation which may be applied for cryptography acceleration. In particular, the invention is directed to a hardware implementation to increase the speed at which SHA1 authentication procedures may be performed on data packets transmitted over a computer network.

2. Description of the Related Art

Message authentication is generally discussed in conjunction with cryptography. Cryptography relates to enciphering and deciphering data. Authentication is concerned with data integrity, including confirming the identity of the transmitting party and ensuring that a message (e.g., a data packet) has not been tampered with en route to the recipient. Many cryptography protocols typically incorporate both encryption/decryption and authentication functionalities. Many methods of practicing both operations are well known in the art and are discussed, for example, in *Applied Cryptography*, Bruce Schneier, John Wiley & Sons, Inc. (1996, $2^{nd}$ Edition), herein incorporated by reference.

In order to improve the speed of cryptography and/or authentication processing of data transmitted over a computer network, specialized chips have been developed, for example, the BCM 5805 available from Broadcom Corporation, Irvine, Calif. It is known that by incorporating both cryptography and authentication functionalities in a single accelerator chip, over-all system performance can be enhanced. Cryptography accelerator chips may be included in routers or gateways, for example, in order to provide automatic IP packet encryption/decryption and/or authentication. By embedding cryptography and/or authentication functionality in network hardware, both system performance and data security are enhanced.

Examples of cryptography protocols which incorporate encryption/decryption and authentication functionalities include the IP layer security standard protocol, IPSec (RFC2406), and other network security protocols including Secure Socket Layer (SSL) (v3) (Netscape Communications Corporation) (referred to herein as SSL) and Transport Layer Security (TLS) (RFC 2246), all commonly used in electronic commerce transactions. IPSec (RFC2406) specifies two standard algorithms for performing authentication operations, HMAC-MD5-96 (RFC2403) and HMAC-SHA1-96 (RFC2404). SSL and TLS use a MAC and an HMAC, respectively, for authentication. The underlying hash algorithm in either case can be either MD5 (RFC1321) or SHA1 (NIST (FIPS 180-1)). SSL and TLS deploy such well-known algorithms as RC4, DES, triple DES for encryption/decryption operations. These network protocols are also described in detail in E. Rescorla, *SSL and TLS: Designing and Building Secure Systems* (Addison-Wesley, 2001) and S. A. Thomas, *SSL & TLS Essentials: Securing the Web* (John Wiley & Sons, Inc. 2000), both of which are incorporated by reference herein for all purposes. These protocols and their associated algorithms are well known in the cryptography and authentication arts and are described in detail in the noted National Institute of Standards and Technology (NIST), IETF (identified by RFC number) and other noted sources and specifications, incorporated herein by reference for all purposes.

Both MD5 and SHA1 authentication algorithms specify that data is to be processed in 512-bit blocks. If the data in a packet to be processed is not of a multiple of 512 bits, padding is applied to round up the data length to a multiple of 512 bits. Thus, if a data packet that is received by a chip for an authentication is larger then 512 bits, the packet is broken into 512-bits data blocks for authentication processing. If the packet is not a multiple of 512 bits, the data left over following splitting of the packet into complete 512 bit blocks must be padded in order to reach the 512-bit block processing size. The same is true if a packet contains fewer than 512 bits of data. For reference, a typical Ethernet packet is up to 1,500 bytes. When such a packet gets split into 512-bit blocks, only the last block gets padded and so that overall a relatively small percentage of padding overhead is required. However for shorter packets, the padding overhead can be much higher. For example, if a packet has just over 512 bits it will need to be divided into two 512-bit blocks, the second of which is mostly padding so that padding overhead approaches 50% of the process data. The authentication of such short data packets is particularly burdensome and time consuming using the conventionally implemented MD5 and SHA1 authentication algorithms.

For each 512-bit data block, a set of operations including non-linear functions, shift functions and additions, called a "round," is applied to the block repeatedly. MD5 and SHA1 specify 64 rounds and 80 rounds, respectively, based on different non-linear and shift functions, as well as different operating sequences. In every round, the operation starts with certain hash states (referred to as "context") held by hash state registers (in hardware) or variables (in software), and ends with a new set of hash states (i.e., an initial "set" of hash states and an end set; a "set" may be of 4 or 5 for the number of registers used by MD5 and SHA1, respectively). MD5 and SHA1 each specify a set of constants as the initial hash states for the first 512-bit block. The following blocks use initial hash states resulting from additions of the initial hash states and the ending hash states of the previous blocks.

Typically, MD5 and SHA1 rounds are translated into clock cycles in hardware implementations. The addition of the hash states, to the extent that they cannot be performed in parallel with other round operations, requires overhead clock cycles in the whole computation. The computation of the padded portion of the data is also generally considered performance overhead because it is not part of the true data. Accordingly, the performance of MD5 and SHA1 degrade the most when the length of the padding is about the same as the length of the data (e.g., as described above, when a packet has just fewer than 512 bits of data and the padding logic requires an extra 512-bit to be added for holding the pad values).

Figure 1:
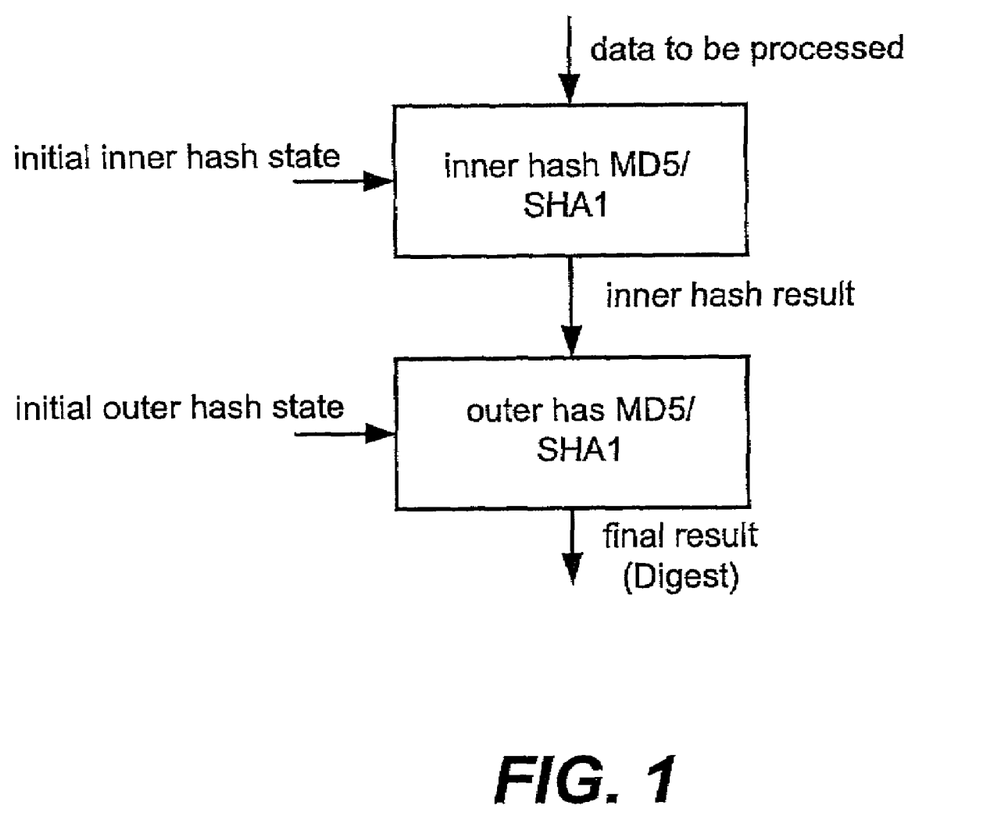
FIG. 1 is a high-level block diagram depicting the HMAC-x algorithm (HMAC for either MD5 or SHA1) implemented in the IPSec standard protocol.

Moreover, the HMAC-MD5-96 and HMAC-SHA1-96 algorithms used in IPSec expand MD5 and SHA1, respectively, by performing two loops of operations. The HMAC algorithm for either MD5 or SHA1 (HMAC-x algorithm) is depicted in FIG. 1. The inner hash (inner loop) and the outer hash (outer loop) use different initial hash states. The outer hash is used to compute a digest based on the result of the inner hash. Since the result of the inner hash is 128 bits long for MD5 and 160 bits long for SHA1, the result must always be padded up to 512 bits and the outer hash only processes the one 512-bit block of data. HMAC-MD5-96 and HMAC-SHA1-96 provide a higher level of security, however additional time is needed to perform the outer hash operation. This additional time becomes significant when the length of the data to be processed is short, in which case, the time required to perform the outer hash operation is comparable to the time required to perform the inner hash operation.

Authentication represents a significant proportion of the time required to complete cryptography operations in the application of cryptography protocols incorporating both encryption/decryption and MD5 and/or SHA1 authentication functionalities. In the case of IPSec, authentication is often the time limiting step, particularly for the processing of short packets, and thus creates a data processing bottleneck. In particular, of the two algorithms supported by the IPSec protocol, HMAC-SHA1-96 is about twenty-five percent slower than HMAC-MD5-96 in terms of the total computation rounds. Accordingly, techniques to accelerate authentication and relieve this bottleneck would be desirable. Further, accelerated implementations of SHA-1 would benefit any application of this authentication algorithm.

SUMMARY OF THE INVENTION

In general, the present invention provides an architecture (hardware implementation) for an authentication engine to increase the speed at which SHA1 multi-loop and/or multi-round authentication algorithms may be performed on data packets transmitted over a computer network. As described in this application, the invention has particular application to the variant of the SHA1 authentication algorithms specified by the IPSec cryptography standard. In accordance with the IPSec standard, the invention may be used in conjunction with data encryption/decryption architecture and protocols. However it is also suitable for use in conjunction with other non-IPSec cryptography algorithms, and for applications in which encryption/decryption is not conducted (in IPSec or not) and where it is purely authentication that is accelerated. Among other advantages, an authentication engine in accordance with the present invention provides improved performance with regard to the processing of short data packets.

In one aspect, the present invention pertains to an authentication engine architecture for an SHA-1 multi-round authentication algorithm. The authentication architecture includes a hash engine configured to implement hash round logic for an SHA1 authentication algorithm. The hash round logic implementation includes a combined adder tree with a timing critical path having a single 32-bit carry look-ahead adder (CLA). The required additions are done in a single clock cycle by rearranging the order of the CLA and circular shift operations.

As noted above, of the two algorithms supported by the IPSec protocol, HMAC-SHA1-96 is about twenty-five percent slower In another aspect, the invention pertains to a method of authenticating data transmitted over a computer network. The method involves receiving a data packet stream, splitting the packet data stream into fixed-size data blocks, and processing the fixed-size data blocks using a multi-round authentication engine architecture. The architecture implements hash round logic for a SHA1 multi-round authentication algorithm having a combined adder tree with a timing critical path having a single 32-bit carry look-ahead adder (CLA). The additions are done in a single clock cycle by rearranging the order of the CLA and circular shift operations.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF EMBODIMENTS OF THE INVENTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, the present invention provides an architecture (hardware implementation) for an authentication engine to increase the speed at which SHA-1 authentication algorithms (including multi-loop implementation (e.g., HMAC))

may be performed on data packets transmitted over a computer network. Authentication engines in accordance with the present invention apply a variety of techniques that may include, in various applications, collapsing two SHA-1 authentication algorithm processing rounds into one; reducing operational overhead by ordering the additions required by an SHA-1 authentication algorithm in such a manner as to reduce the overall critical timing path ("hiding the adds"); and, for an HMAC (multi loop) variant of an SHA-1 authentication algorithm, pipelining the inner and outer loops. Among other advantages, an authentication engine in accordance with the present invention provides improved performance with regard to the processing of short data packets.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The present invention may be implemented in a variety of ways. As described in this application, the invention has particular application to the variants of the SHA1 authentication algorithm specified by the IPSec cryptography standard. In the following description, the invention is discussed primarily in connection with the IPSec protocol. In this regard, while the present invention is directed towards acceleration of the SHA-1 authentication algorithm, the description also includes reference to the MD5 algorithm, which is also available in IPSec, to provide context in which the present invention may be implemented. Further, one of skill in the art will recognize that various aspects of the invention may also be applied to other applications of the SHA-1 authentication algorithm generally, whether or not used with IPSec or in conjunction with cryptography operations at all. Further, while the aspects of the present invention described below are used together in a preferred embodiment of the invention, some aspects may be used independently to accelerate authentication operations. For example, the pipelining operations are particularly applicable to multi-loop, multi-round authentication algorithms; while the round-collapsing and ordering of the additions operations are particularly applicable to SHA1 and variant authentication algorithms. In particular, the present invention provides a method and logic for conducting the required additions in a single clock cycle using a single 32-bit CLA by rearranging the order of the CLA and circular shift operations performed.

Pipelining Inner and Outer Hash Operations

Figure 2:
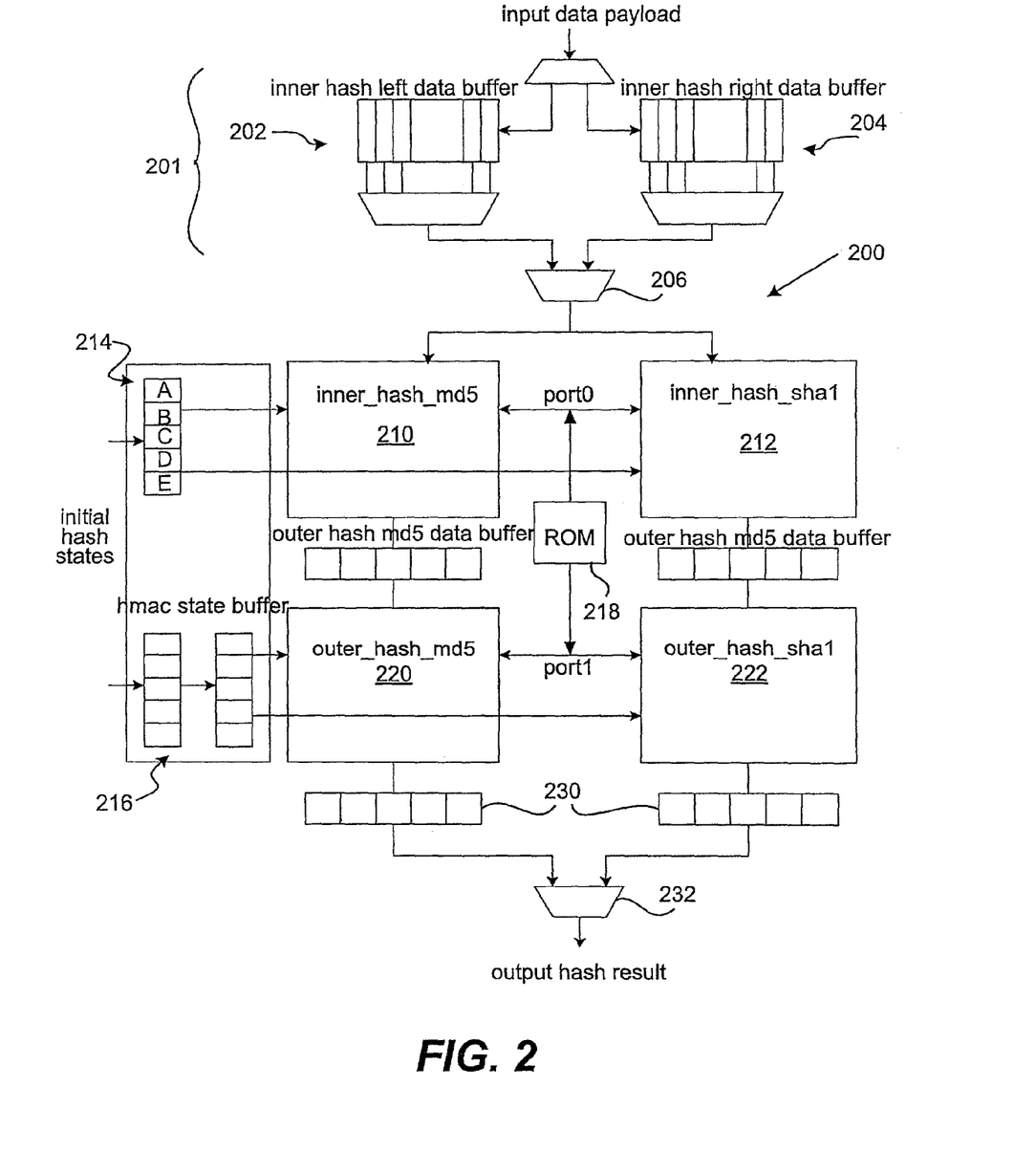
FIG. 2 is a high-level block diagram of an authentication engine architecture in accordance with one embodiment the present invention.

FIG. 2 is a high-level block diagram of an authentication engine architecture in accordance with one embodiment the present invention. The engine architecture implements a pipelined structure to hide the time required for performing the outer hash operation when multiple data payloads are fed to the engine continuously. The engine architecture includes a core having two instantiations of the hash round logic; in this instance, inner and outer hash engines (inner and outer loops) for each of the MD5 hash round logic and the SHA1 hash round logic supported by the IPSec protocol. Pipeline control logic ensures that the outer hash operation for one data payload is performed in parallel with the inner hash operation of the next data payload in the packet stream fed to the authentication engine. A dual-frame input buffer is used for the inner hash engine, allowing one new 512-bit block to be loaded while another one is being processed, and the initial hash states are double buffered for concurrent inner hash and outer hash operations. In addition, dual-ported ROM is used for concurrent constant lookups by both inner and outer hash engines.

Referring to FIG. 2, the engine 200 includes a dual-frame input data payload buffer 201, in this instance having left frame 202, and a right frame 204. Input data payloads received by the engine 200, for example from data packets received off a network by a chip on which the engine architecture is implemented, are distributed between the frames 202, 204 of the input data buffer 201 so that one data block may be loaded into the buffer while another one is being processed downstream in the data flow. Since FIG. 2 illustrates an implementation of the present invention for processing IPSec packets, the architecture includes hash engines for the MD5 and SHA1 authentication protocols supported by IPSec. In accordance with the MD5 and SHA1 protocols, the input data payloads are loaded into the dual frames of the input data buffer 201, split into 512-bit data blocks, padded if necessary (i.e., where the data block is less than 512 bits) and stored prior to being passed to an inner hash engine for processing. A multiplexer 206 controls the flow of 512-bit data blocks from the frames of the input buffer to an inner hash engine.

Initial hash states are needed on per packet basis for the first data block of each packet. Initial hash states, are generated by software based on the authentication key and some default constant states based on the HMAC algorithm (pre-hashed), in accordance the specifications for these algorithms. This is typically done once per key. Alternatively, the initial states may be derived from the default constant states and the authentication key using the same hardware for every packet that requires authentication.

The initial hash states for the inner hash of a given data block are loaded into a buffer 214 associated with the inner hash engine(s) 210, 212. The initial hash states for the outer hash of that data block are loaded into the first 215 of a pair of buffers 215, 216 (referred to as an HMAC state buffer) associated with the outer hash engine(s) 220, 222. When the initial hash states are passed to the inner hash engine for processing of the data block, the outer hash states for that block are loaded into the second buffer 216, and the inner and outer initial hash states for the next packet to be processed are loaded into the buffers 214, 215, respectively. In this way, the synchronization of the inner and outer hash states for a given data block is maintained, and the initial hash states are available for concurrent inner hash and outer hash operations. Further, the double buffering of the hash states allows initial hash states of the second packet to be loaded while the first packet is being processed so that the data processing is continuous from packet to packet, thereby maximizing the efficiency and processing power of the hash engine.

The engine 200, further includes a dual-ported ROM 218. The dual-ported ROM 218 further facilitates the parallel inner and outer has operations by allowing for concurrent constant lookups by both inner and outer hash engines.

The inner hash is conducted on all 512 bit blocks of a given data packet. The result of the inner hash is 128 bits long for MD5 and 160 bits long for SHA1. The result is padded up to 512 bits and the outer hash processes the one 512 bit block of data to compute a digest based or the result of the inner hash. An output buffer 230 stores the digest and outputs it through a multiplexer 232.

Collapsing SHA-1 Authentication Algorithm Processing Rounds

As noted above, of the two algorithms supported by the IPSec protocol, HMAC-SHA1-96 is about twenty-five percent slower than HMAC-MD5-96 in terms of the total computation rounds. One way to improve HMAC-SHA1-96 in an IPSec-supporting hardware implementation is to collapse multiple rounds of logic into a single clock cycle thus the total number of clocks required for HMAC-SHA1-96 operation is reduced. The same approach may be applied to any multi-round authentication algorithm. However, simply collapsing the logic for multiple rounds into a single clock cycle can cause the delay to compute the collapsed logic to increase, therefore reducing the maximum clock frequency.

Figure 3:
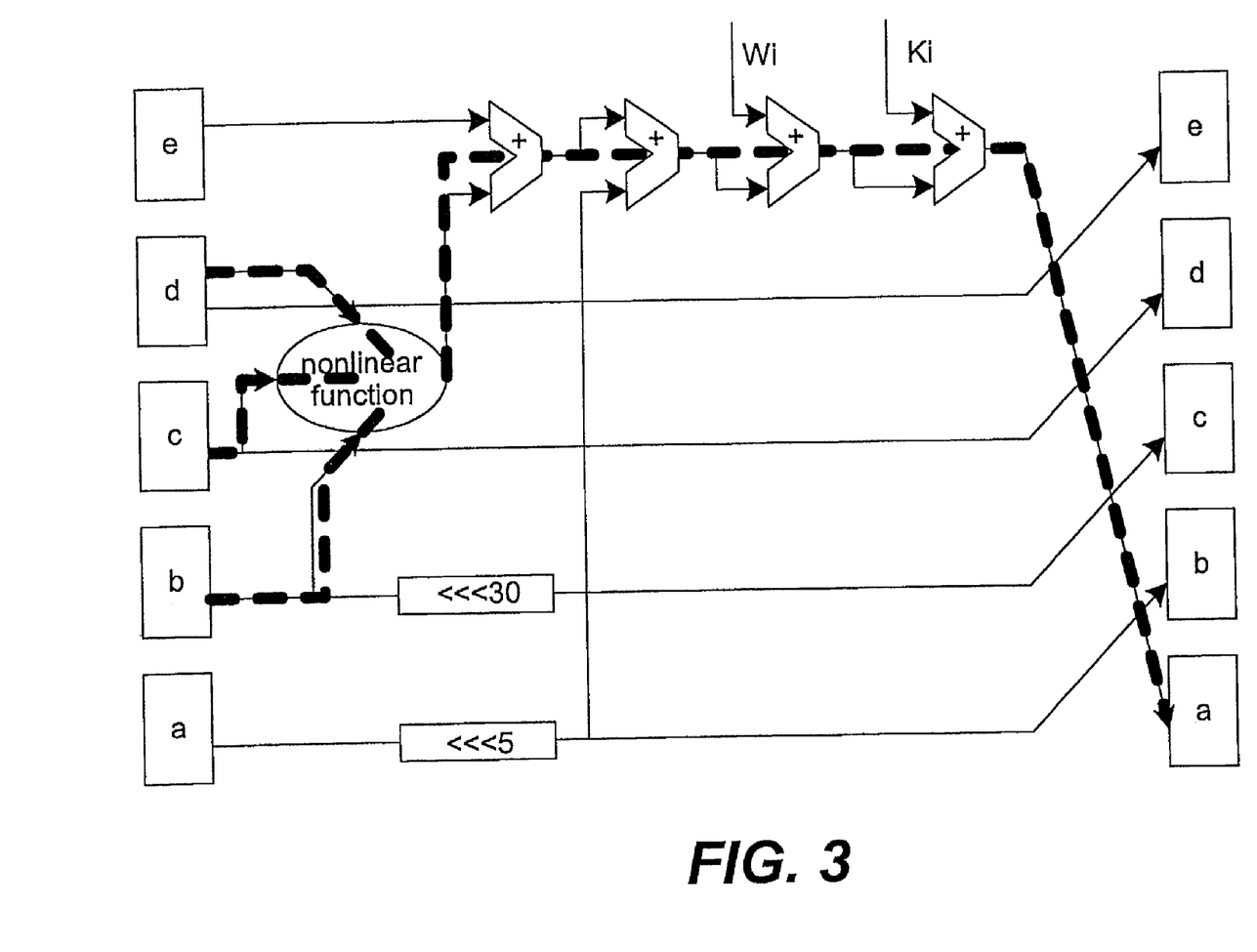
FIG. 3 is a time study diagram illustrating the critical path of the conventional round logic of the SHA1 authentication algorithm.

FIG. 3 is a time study diagram illustrating the timing critical path of the conventional round logic of the SHA1 authentication algorithm. Registers a, b, c, d and e hold the intermediate hash states between rounds. They are duplicated in this figure to demonstrate the ending points of the logic paths clearly. In the actual design, the paths are fed back to the same set of registers because the round logic is reused 80 times. The "+" symbols identify standard adders implemented as carry look-ahead adders (CLAs). $W_i$ represents the incoming payload. $K_i$ represents a constant, obtained from ROM used in the authentication computations. It is shown in the figure that the timing critical paths are from registers b, c and d, going through the non-linear function (defined by the SHA1 specification) and the adders and ending at register a. Registers b, c, d and e each receives a non-critical input (b receives a, etc.).

Figure 4:
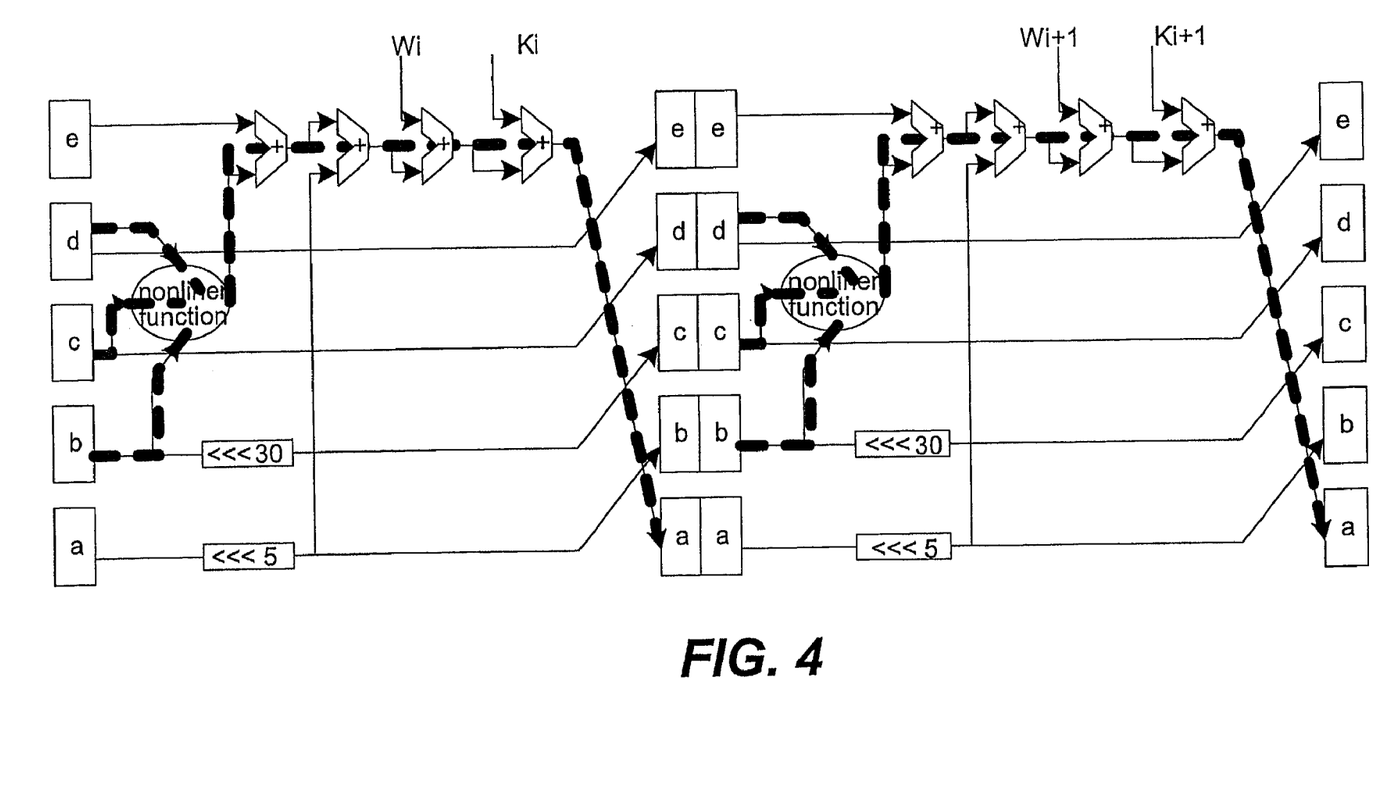
FIG. 4 is a time study diagram illustrating the critical path of the round logic of the SHA1 authentication algorithm in accordance with one embodiment the present invention.

FIG. 4 is a time study diagram illustrating the timing critical path of the collapsed round logic of the SHA1 authentication algorithm in accordance with one embodiment the present invention. The SHA1 algorithm specifies five registers. As illustrated above, the data path of four of the five registers in any SHA1 round are not critical (time limiting). In accordance with this invention, in successive SHA1 rounds the registers having the critical path are alternative so that four registers worth of data may always be passed on to the next round prior to completion of the critical path in the current round. Thus, when two rounds of SHA1 are put together, the critical path computation of the second round is independent of that of the first round, since the receiving register of the critical path of the first round (i.e., register a) is not the driving register of the critical path of the second round (i.e., register e). This approach demonstrates how two SHA1 rounds may be collapsed together while maintaining the same amount of delay for the timing critical path, and how by alternating the critical path from register to register between rounds in this way, the adding operations may be "hidden."

In a preferred embodiment, the eighty rounds of an SHA1 loop are collapsed into forty rounds. As described and illustrated above, the collapsing of rounds is accomplished by having a single set of registers (the preferred embodiment has 5 registers as defined by the IPSec protocol) with two rounds of logic. It is contemplated that the techniques of invention described herein can also be applied to further collapse the number of SHA1 rounds in an SHA1 loop into twenty or even fewer rounds.

Ordering the Additions

As described above, both MD5 and SHA1 algorithms specify that the final hash states of every 512-bit block are to be added together with the initial hash states. The results are then used as the initial states of the next 512 bit block. In MD5, values of four pairs of 32-bit registers need to be added and in SHA1, five pairs. Considering that each 32-bit addition takes one clock cycle, a typical hardware implementation would use four extra cycles in MD5 and five extra cycles in SHA1 to perform these additions if hardware resources are limited.

As noted above with reference to FIGS. 3 and 4, in both MD5 and SHA1, only one state register is re-computed every round. The rest of the state registers use shifted or non-shifted contents from neighboring registers. Thus, the final hash states are not generated in the final round, but rather in the last four consecutive MD5 rounds or five SHA1 rounds, respectively. The present invention exploits this observation by providing architecture and logic enabling the ordering of the additions as early as the final hash state is available, hiding the computation time completely behind the round operations. This is illustrated in the following scheduling tables in which 'Ti' represents one clock cycle and 'rnd i' represents round operation. The initial hash states are represented by ia, ib, ic, id and ie. Parallel operations are listed in the same column.

| MD5 | | | | | | | | |
|---|---|---|---|---|---|---|---|---|
| T1 | T2 | T3 | ----------- | T61 | T62 | T63 | T64 | T1 |
| rnd 1 | rnd 2 | rnd 3 | — | rnd 61 | rnd 62 | rnd 63 | rnd 64 | rnd 1 |
| | | | | | a + ia | d + id | c + ic | b + ib |

| original SHA1 | | | | | | | | |
|---|---|---|---|---|---|---|---|---|
| T1 | T2 | T3 | ----------- | T77 | T78 | T79 | T80 | T1 |
| rnd 1 | rnd 2 | rnd 3 | — | rnd 77 | rnd 78 | rnd 79 | rnd 80 | rnd 1 |
| | | | | e + ie | d + id | c + ic | b + ib | a + ia |

| collapsed SHA1 | | | | | | | |
|---|---|---|---|---|---|---|---|
| T1 | T2 | T3 | ----------- | T38 | T39 | T40 | T1 |
| rnd 1 | rnd 2 | rnd 3 | — | rnd 38 | rnd 39 | rnd 40 | rnd 1 |
| | | | | | e + ie | d + id | b + ib |
| | | | | | | c + ic | a + ia |

In one embodiment of the invention, a plurality of adds with the final hash states may be accomplished in a single clock cycle. An example is shown in the "collapsed SHA1" table, in which the five adds are performed in just three clock cycles T39, T40 and T1 of the next loop. One of skill in the art will recognize that, consistent with the principles of this invention described herein, it is possible to perform more than two adds in parallel in one clock cycle. Moreover, it should be noted that, as illustrated in the tables, this aspect of the present invention is applicable to both collapsed and non-collapsed multi-round authentication algorithms. Implementation of this aspect of the present invention in conjunction with a collapsed multi-round algorithm is particularly advantageous since hiding of adding steps becomes increasingly important as the number of rounds is decreased. Adds that are not hidden in the manner of this aspect of the present invention would represent an even larger proportion of overhead in a collapsed round implementation than in an implementation with a higher number of rounds.

Logic Design

Figure 5:
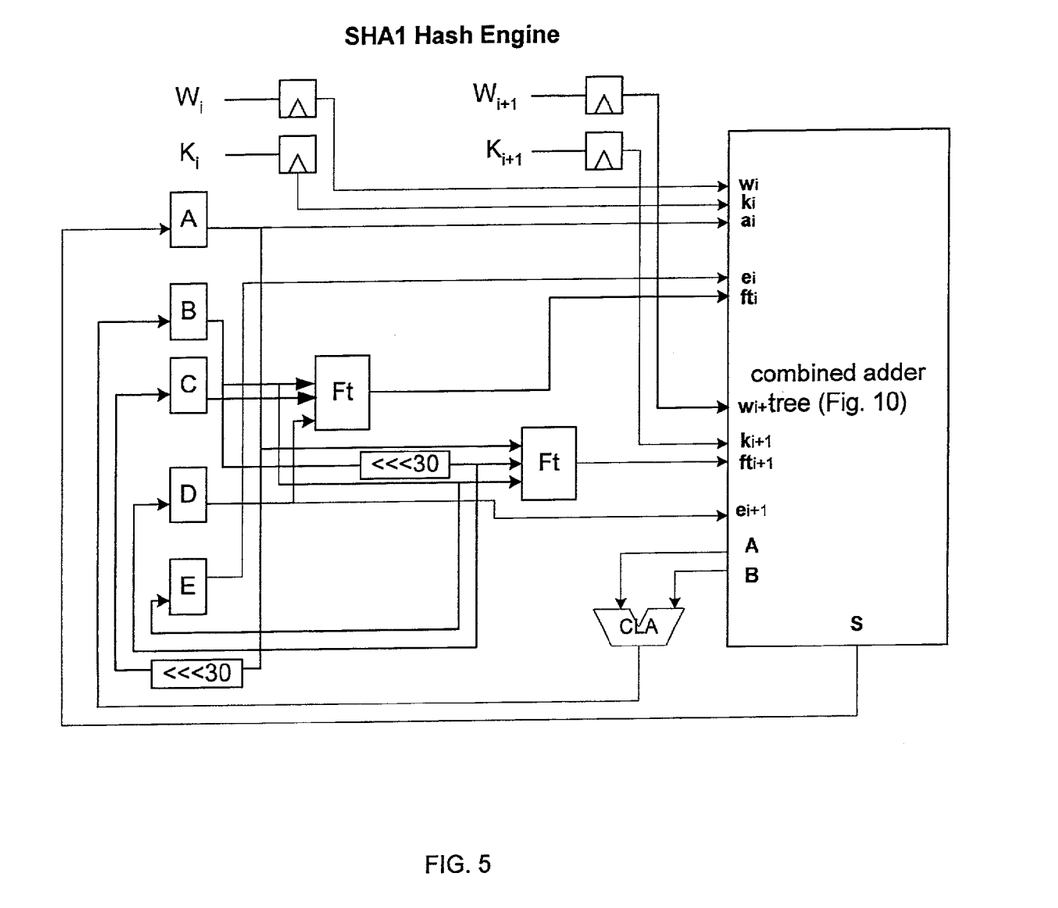
FIG. 5 is a high-level block diagram of an SHA1 hash engine illustrating the major elements of a round logic design in accordance with one embodiment the present invention.
Figure 7:
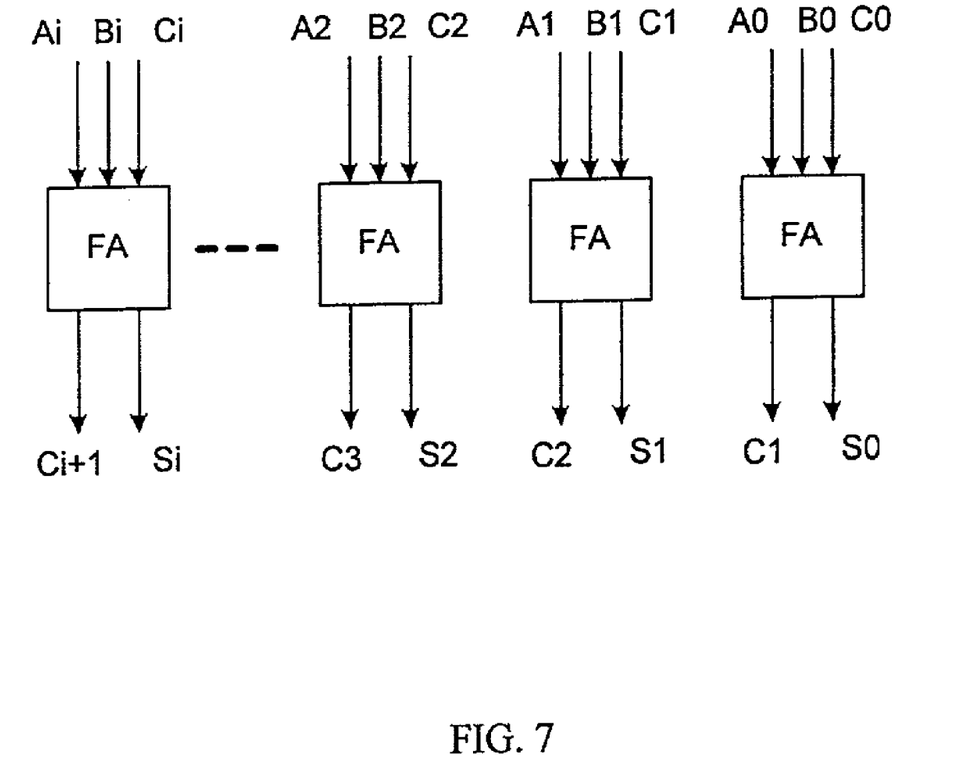
FIG. 7 illustrates a block diagram of a carry save adder cell.
Figure 8:
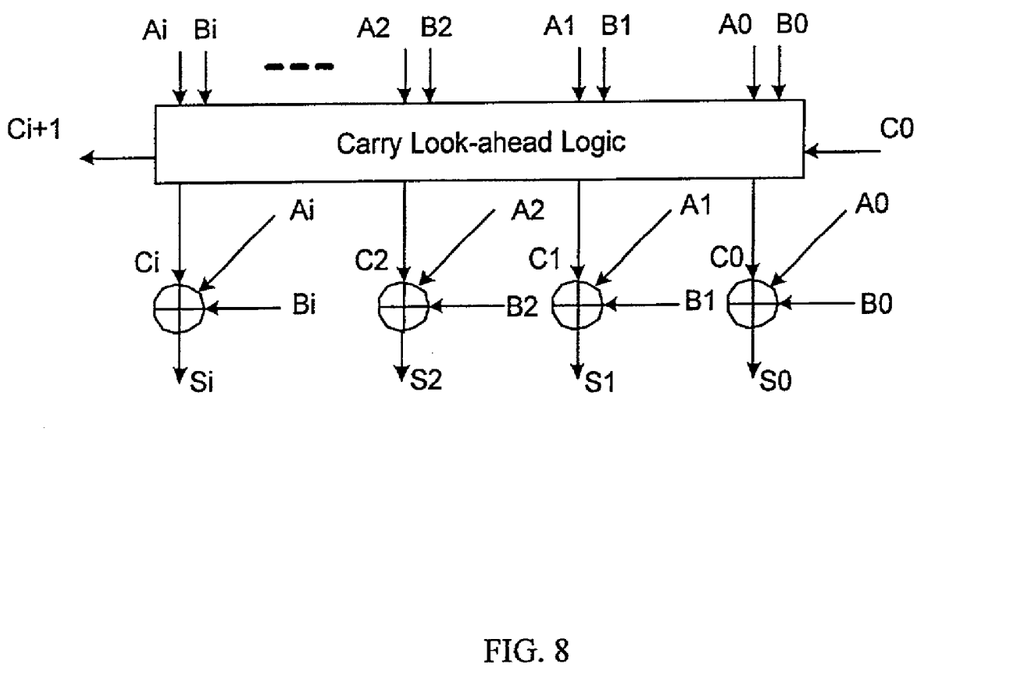
FIG. 8 illustrates a block diagram of a carry look-ahead adder cell.

FIG. 5 is a high-level block diagram of an SHA1 hash engine illustrating the major elements of a collapsed round logic design in accordance with one embodiment the present invention consistent with the timing critical path study of FIG. 4. Hardware implementation of addition operations may be carried out using a variety of operators, referred to as adders, well known to those of skill in the art. The main types of multi-bit adders are carry propagate adder (CPA), carry save adder (CSA) and carry look-ahead adder (CLA). CPAs, CSAs and CLAs are generally composed of single bit adders referred to as full-adder (FA) and half-adder (HA). Referring to FIGS. 6 through 8, the various adders noted above are described, considering two k-bit integers A and B as two inputs to the adders: Let $A_i$ and $B_i$ for $i=1, 2, \ldots, k-1$ represent the bits of the integer A and B, respectively.

Figure 6A:
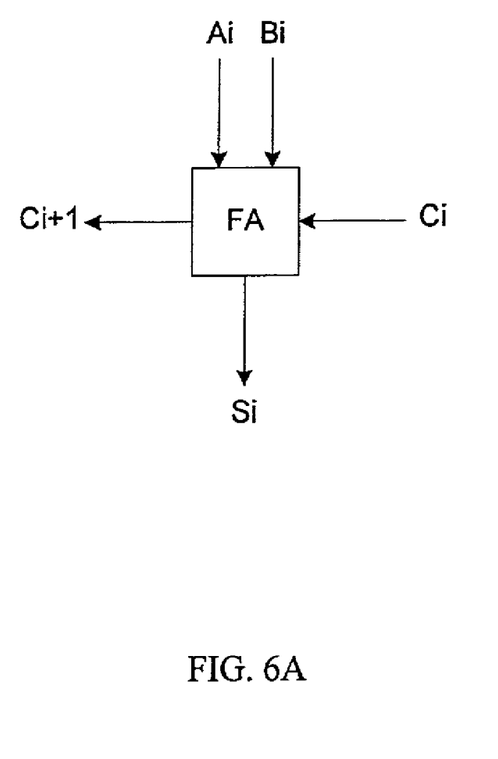
FIGS. 6A and 6B illustrate block diagrams of a full-adder cell (FA) and a half-adder cell (HA), respectively.
Figure 6B:
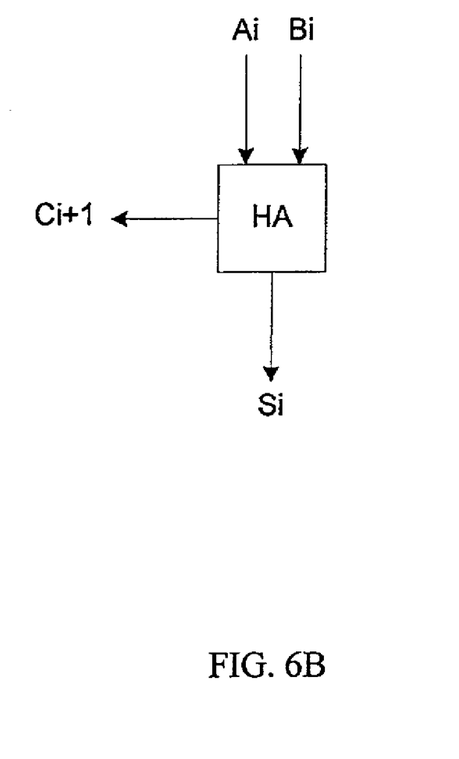

FIGS. 6A and 6B illustrate block diagrams of a full-adder cell (FA) and a half-adder cell (HA), respectively. The difference between these two is that the FA has an additional carry input (Ci). The Boolean functions of the adder outputs can be expressed as:

$$C_{i+1}=A_iB_i+A_iC_i+B_iC_i$$

$$S_i=A_i{}^\wedge B_i{}^\wedge C_i$$

where the symbol '^' represents logic exclusive-OR.

A carry propagate adder is a multi-bit adder containing a serially connected FA chain. The carry output of each FA stage can propagate up through all the higher order stages. The CPA is a simple representation of the logic concept of multi-bit addition operations, but due to the long propagation delay of the carry, it has little practical value in designing wide adders.

FIG. 7 illustrates a block diagram of a carry save adder cell. A CSA is a multi-bit adder made out of an array of FAs. A CSA does not propagate the carry upstream. Instead, it saves the carry together with the intermediate sum. A CSA has three inputs (Ai, Bi, Ci) and two outputs (Ci+1, Si). When a CSA is used to add up multiple operands, it can quickly reduce the total number of operands. CSAs are widely used in multiplier design where a large number of partial sums need to be added together.

FIG. 8 illustrates a block diagram of a carry look-ahead adder cell. A CLA is designed to reduce the carry propagation delay. It uses specially designed logic to compute carry prior to the summation. The module 'Carry Look-ahead Logic' in FIG. 8 represents the logic that generates C1, C2 . . . based on P and G in the equations that follow. Once the carries are generated, on a per bit basis, there will be the two inputs Ai and Bi as well as the final carry input. The sum (S1, S1) is an XOR result of all three inputs.

According to the carry computing logic, two variables are defined, the generation (G) and the propagation (P). The generation represents whether or not a specific bit or bit groups based on the input values can produce a carry. The propagation represents whether or not a carry can ripple though a specific bit or bit groups.

$$G_i=A_iB_i$$

$$P_i=A_i+B_i \text{ (logical OR)}$$

$$C_{i+1}=G_i+C_iP_i$$

By applying this logic all the carries can be computed as follows:

$$C_1=G_0+C_0P_0$$

$$C_2=G_1+G_0P_1+C_0P_0P_1$$

$$C_3=G_2+G_1P_2+G_0P_1P_2+C_0P_0P_1P_2$$

$$C_4=G_3+G_2P_3+G_1P_2P_3+G_0P_0P_1P_2+C_0P_0P_1P_2P_3$$

and so on.

The sum of each bit can be computed as:

$$S_i=A_i{}^\wedge B_i{}^\wedge C_i$$

Returning to FIG. 5, the design, in accordance with the present invention, makes use of carry save adders (CSA; delay is equivalent to 1-bit adder) and carry look-ahead adders (CLAs) to achieve best speed. As noted above, CSAs efficiently add multiple quantities together to generate partial products which are not propagated, and CLAs are designed to reduce the carry propagation delay. The circular shift is a re-map of the bits. It does not consume any time. In accordance with the present invention, the additions are done in a single clock cycle by rearranging the order of the CLA and circular shift operations such that only a single CLA is needed in the critical path.

Figure 9A:
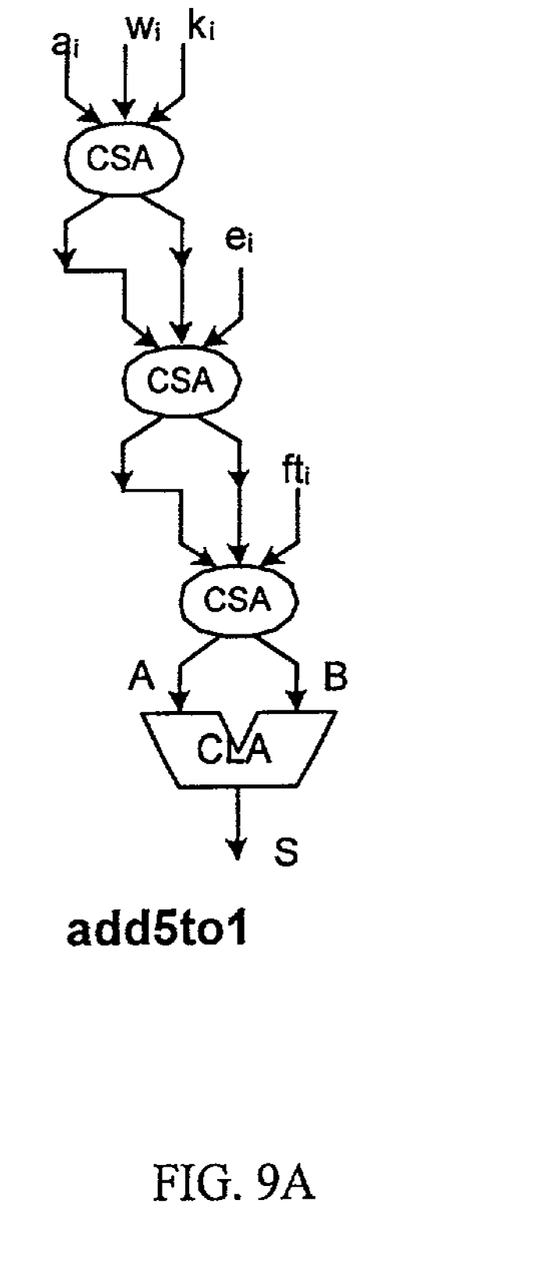
FIGS. 9A and 9B illustrate block diagrams of the add5to1 and add4to1 comprehensive addition modules, respectively.
Figure 9B:
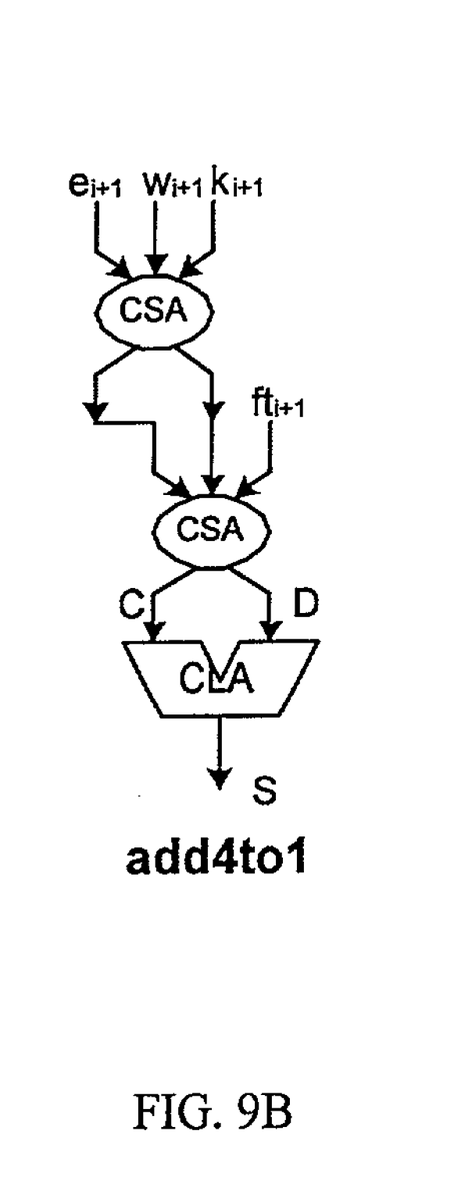

Two comprehensive addition modules, add5to1 and add4to1, in the architecture each use several stages of CSA followed-by a carry look-ahead (CLA) adder, as illustrated and described in more detail with reference to FIG. 10, below. FIGS. 9A and 9B illustrate block diagrams of the add5to1 and add4to1 comprehensive addition modules, respectively. The add 5to 1 module includes three CSA adders followed by a CLA. The add4to1 module includes two CSA adders followed by a CLA.

The hash engine has five registers, A, B, C, D and E. The initial hash state in register A ($a_i$) is added to the initial hash state in register E ($e_1$), the payload data ($W_i$), a constant ($K_i$), and the result of a function ($F_t$) of the initial hash states in registers B, C and D by a combination of CSA and CLA adders in a combined adder tree (FIG. 10). The initial hash state in register D ($d_1$) is added to the payload data ($W_{i+1}$), a constant ($K_{i+1}$), and the result of a function ($F_t$) of the initial hash states in registers A, B (which passes through a 30-bit circular shift) and C by the combined adder tree (FIG. 10).

The adder modules conclude with a carry look-ahead (CLA) adder. The sum of each adder module is added by a CLA adder to generate and propagate a final sum for the round which is then fed back into register A for the next round. As shown more clearly in FIG. 10, the most timing critical input of these two modules (add5to1 and add4to1) goes through the last CSA reduction and the CLA stage.

Figure 10:
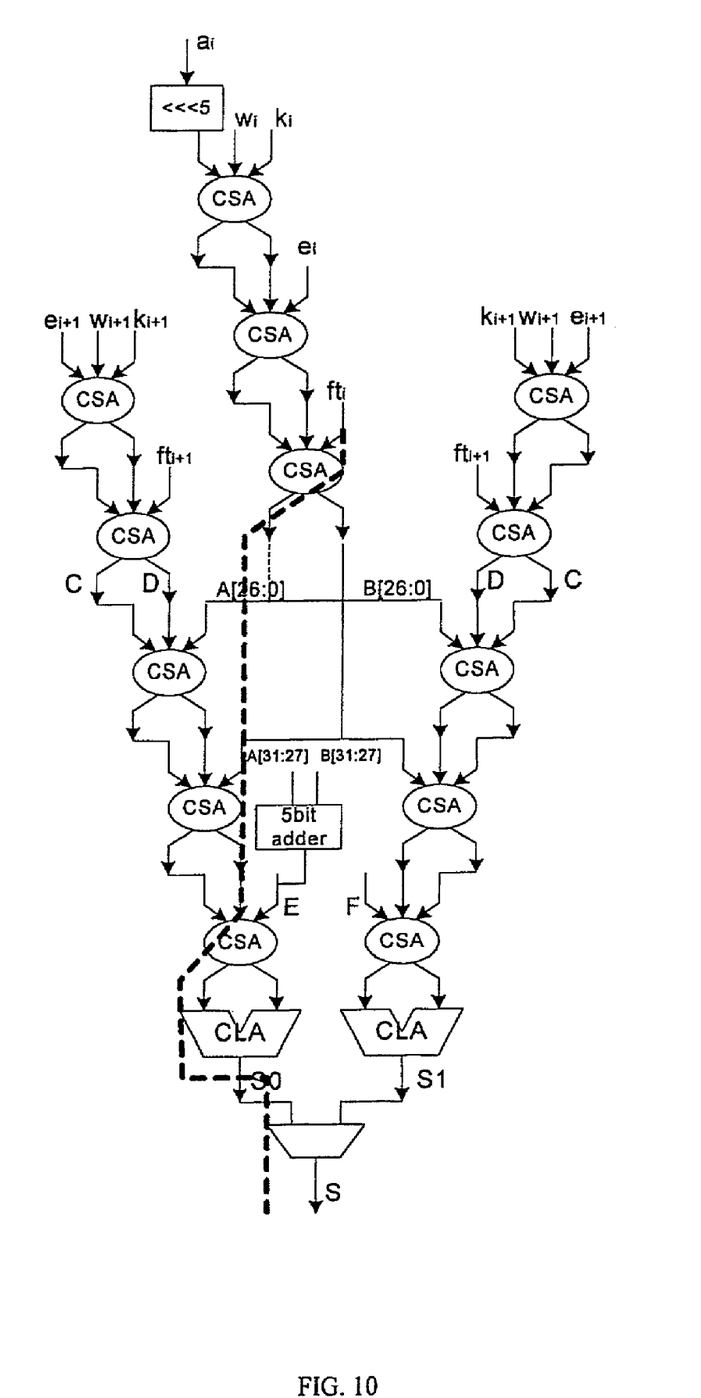
FIG. 10 is a lower-level block diagram illustrating details of the ordering of the additions in a combined adder tree within the round logic design of FIG. 5.

FIG. 10 is a lower-level block diagram illustrating details of the ordering of the additions in a combined adder tree within the round logic design of FIG. 5. It is observed that the logic of the combined two SHA1 rounds contains the summation of multiple register values (a through e) with inputs W and K and a circular shift operation (<<<5). The most time consuming (i.e., critical path) computation in the unrolled SHA1 rounds can be expressed as:

$$S=((a<<<5)+f(b, c, d)+e+w[i]+k[i])<<<5+f(b, c, d)+e+w[i+1]+k[i+1]$$

where, a, b, c, d, e, w and k are 32-bit quantities.

The operation may logically be performed in two steps: Step 1 using module add5to1 to generate, $$Si=(a<<<5)+f(b, c, d)+e+w[i]+k[i],$$

and Step 2 using module add4to1 and a 32-bit carry look-ahead adder (CLA) to generate, $$S=Si<<<5+f(b, c, d)+e+w[i+1]+k[i+1].$$

In each step, carry save adders (CSAs) are used to perform 3-to-2 reductions on the total number of operands, as illustrated in FIG. 9. CSAs are applied as much as possible in both steps. Using A and B to represent the outputs of cascaded CSAs (3 levels) in Step 1 and C and D to represent the outputs of cascaded CSAs (2 levels) in Step 2, the final result, S, may be expressed as:

$$S(A+B)<<<5+C+D.$$

In the implementation described above, a circular shift is performed on Si of Step 1, so a CLA is required in Step 1 to compute Si before the shift operation. A second CLA is required in Step 2 to compute the final result. Therefore, the overall delay of both steps is equivalent to two 32-bit CLA delays plus one 32-bit CSA delay plus the delay for function 'f' for the most timing critical path. The reason that only one CSA delay is counted is because the most time-critical input is fed into the last CSA stage rather than propagated through multiple CSAs.

Logic implementation according to the present invention extends the effectiveness of CSA across both steps. In so doing, the partial results of Step 1 can be saved without applying CLA, removing one CLA from the critical path (CLA is always time-consuming due to the carry propagation). This is achieved by manipulating the position of the circular shift, normally happening at a fixed bit location in SHA1. In accordance with the present invention, the order of the circular shift operation is switched with the last CLA addition (A+B) in Step 1, thereby replacing the CLA operation in Step 1 with more CSAs.

In order to perform circular shift operations on A and B before they are summed together, the following is derived:

$$S0=\{A[26:0], 5'b0\}+\{B[26:0], 5'b0\}+C+D+\{27'b0, E\}$$

$$S1=\{A[26:0], 5'b0\}+\{B[26:0], 5'b0\}+C+D+\{27'b0, F\}$$

where E and F are 5-bit quantities derived from:

$$E=A[31:27]+B[31:27]$$

$$F=A[31:27]+B[31:27]+5'b01$$

The need to have E and F is due to the fact that a carry may be generated from A[26:0]+B[26:0]. Since A and B are not summed up first, it is not known if the upper five bits will receive a carry from the lower bits. Therefore two cases are computed, one with carry input (F), and the other without (E).

S0 and S1 are computed using the module add5to1 since the constraint of the circular shift is removed from the equations. During this computation, only one CLA is needed at the last step. In order to select between S0 and S1 as the final result, the highest carry output of (A[26:0]+B[26:0]) is computed in parallel with the CLA. This can be done slightly faster than the CLA step, because there are only 27-bits to compute and only the most significant carry output is needed since that carry output will be used to select between the two sets of results. There is no need to compute the sum in this case. Therefore, it never becomes timing critical.

The overall delay of the unrolled SHA1 rounds now becomes the delay to compute S0 or S1 plus the delay to select between them (using a multiplexer (MUX)). A 32-bit CSA is an array of FAs. The delay associated with a 32-bit CSA is the same as the delay for a FA. Since E and F are the outputs of 5-bit adders based on A[31:27] and B[31:27], this delay is on the order of two FAs, based on the complexity to compute the carries and sum of 5-bit adders using P and G. Either the delay of two CSAs (FAs) or the delay of a 5-bit adder should be significantly smaller than that of a 32-bit CLA. Thus, the delay to obtain S0 or S1 is equivalent to one 5-bit addition, plus one 32-bit CSA, plus a multiplexer operation (the MUX delay associated with selecting between S0 and S1), plus one 32-bit CLA, assuming the 5-bit addition needed to generate E and F is slower than the delay of two 32-bit CSAs. Otherwise, the critical timing path goes through three 32-bit CSAs, plus a multiplexer operation (the MUX delay associated with selecting between S0 and S1), plus 1 32-bit CLA. In either case, the delay is much less than a timing critical path that includes two CLAs.

Thus, the approach of the present invention trades off one 32-bit CLA delay with the worse of one 5-bit CLA or two 32-bit CSAs, plus the additional MUX delay. The design results in significant acceleration due to the time saved by eliminating the 32-bit CLA.

Implementations of the invention using this logic design in an authentication engine using the HMAC-SHA1 algorithm of the IPSec protocol, collapsing of the conventional 80 SHA1 rounds into 40 rounds, hiding the adds, and pipelining the inner and outer loops may enable HMAC-SHA1 to be conducted in approximately the same time as conventional SHA1, or less. Conclusion Although the foregoing invention has been described in some detail for purposes of clarity of understanding, those skilled in the art will appreciate that various adaptations and modifications of the just-described preferred embodiments can be configured without departing from the scope and spirit of the invention. For example, while the present invention has been described primarily in connection with the IPSec protocol, the principles of many aspects of the invention may also be applied to multi-round authentication algorithms generally, whether or not used in conjunction with cryptography operations. Therefore, the described embodiments should be taken as illustrative and not restrictive, and the invention should not be limited to the details given herein but should be defined by the following claims and their full scope of equivalents.

What is claimed is:

1. An authentication engine architecture for a SHA-1 multi-round authentication algorithm, comprising:
    a hash engine configured to implement hash round logic for a SHA-1 authentication algorithm, the SHA-1 hash round logic including,
    a combined adder tree having:
        a timing critical path configured to produce a first output, the timing critical path having a single 32-bit carry look-ahead adder (CLA),
        a second path, parallel to the timing critical path, configured to produce a second output, the second path having a single CLA, and
    a selector configured to select an output from the output of the timing critical path and theoutput of the second path.

2. The authentication engine architecture of claim 1, wherein said hash round logic implementation has a timing critical path equivalent to:
    thee 32-bit CSAs, a multiplexer operation, and one 32-bit CLA.

3. The authentication engine architecture of claim 1, wherein the additions performed by the combined adder tree are preceded by a 5-bit circular shifter.

4. The authentication engine architecture of claim 3, wherein combined adder tree includes add 5to1 and add 4to1 adders.

5. The authentication engine architecture of claim 1, wherein the combined adder tree is configured such that addition computations are conducted in parallel with round operations.

6. The authentication engine architecture of claim 1, wherein the architecture is implemented as an authentication engine architecture for a multi-loop, SHA-1 authentication algorithm, comprising:
- a first instantiation of a SHA-1 authentication algorithm hash round logic in an inner hash engine;
- a second instantiation of a SHA-1 authentication algorithm hash round logic in an outer hash engine;
- a dual-frame payload data input buffer configured for loading one new data block while another data block one is being processed in the inner hash engine;
- an initial hash state input buffer configuration for loading initial hash states to the inner and outer hash engines for concurrent inner hash and outer hash operations; and
- a dual-ported ROM configured for concurrent constant lookups for both inner and outer hash engines.

7. The authentication engine architecture of claim 6, wherein the multi-loop, multi-round authentication algorithm is HMAC-SHA-1.

8. The authentication engine architecture of claim 1, wherein said hash round logic is implemented such that eighty rounds of a SHA-1 loop are collapsed into forty rounds.

9. The authentication engine architecture of claim 1, wherein said hash engine is configured to implement hash round logic comprising:
- five hash state registers;
- one critical and four non-critical data paths associated with the five registers, such that in successive SHA-1 rounds, registers having the critical path are alternative.

10. The authentication engine architecture of claim 1, comprising a multiplexer to select an output of the combined adder tree.

11. A method of authenticating data transmitted over a computer network, comprising:
- receiving a data packet stream;
- splitting the packet data stream into fixed-size data blocks; and
- processing the fixed-size data blocks using a SHA-1 multi-round authentication engine architecture, said architecture implementing hash round logic for a SHA-1 authentication algorithm, the SHA-1 hash round logic including:
  - a combined adder tree having:
    - a timing critical path configured to produce a first output, the timing critical path having a single 32-bit carry look-ahead adder (CLA),
    - a second path, parallel to the timing critical path, configured to produce a second output, the second path having a single CLA, and
    - a selector configured to select an output from the output of the timing critical path and the output of the second path.

12. The method of claim 11, wherein the hash round logic implementation has a timing critical path equivalent to:
- three 32-bit CSAs, a multiplexer operation, and one 32-bit CLA.

13. The method of claim 11 wherein additions performed by the combined adder tree are preceded by a 5-bit circular shifter.

14. The method of claim 11, further comprising:
- providing five hash state registers; and
- providing data paths from said five state registers such that four of the five data paths from the registers in any SHA-1 round are not timing critical.

15. The method of claim 14, wherein, in successive SHA-1 rounds, registers having the critical path are alternative.

16. The method of claim 15, wherein eighty rounds of a SHA-1 loop are collapsed into forty rounds.

17. The method of claim 11, wherein addition computations are conducted in parallel with round operations.

18. The method of claim 11, wherein said authentication engine is a multi-loop, multi-round authentication engine architecture having a hash engine core comprising an inner hash engine and an outer hash engine, said architecture configured to,
- pipeline hash operations of said inner hash and outer hash engines,
- collapse and rearrange multi-round logic to reduce rounds of hash operations, and
- implement multi-round logic such that addition computations are conducted in parallel with round operations.

19. The method of claim 18, wherein the multi-loop, multi-round authentication algorithm is HMAC-SHA-1.

20. The method of claim 19, wherein said pipelining comprises performance of an outer hash operation for one data payload in parallel with an inner hash operation of a second data payload in a packet stream fed to the authentication engine.

21. The method of claim 20, wherein a dual-frame input buffer is used for the inner hash engine.

22. The method of claim 21, wherein initial hash states for the hash operations are double buffered for concurrent inner hash and outer hash operations.

23. The method of claim 22, wherein concurrent constant lookups are performed from a dual-ported read only memory (ROM) by both inner and outer hash engines.

24. The method of claim 11, comprising performing a multiplexing operation to provide an output of the combined adder tree.

* * * * *

UNITED STATES PATENT AND TRADEMARK OFFICE
CERTIFICATE OF CORRECTION

| | | |
|---|---|---|
| PATENT NO. | : 7,299,355 B2 | Page 1 of 1 |
| APPLICATION NO. | : 10/042019 | |
| DATED | : November 20, 2007 | |
| INVENTOR(S) | : Zheng Qi | |

It is certified that error appears in the above-identified patent and that said Letters Patent is hereby corrected as shown below:

In Claim 1, Column 12, Line 51, please delete "theoutput" and replace with --the output--.

In Claim 2, Column 12, Line 56, please delete "thee 32-bit CSAs" and replace with --three 32-bit CSAs--.

In Claim 4, Column 12, Line 62, please delete "wherein combined adder tree includes add 5to1 and add 4to1 adders." and replace with --wherein the combined adder tree includes add5to1 and add4to1 adders.--.

Column 3, Lines 56-58, please delete "As noted above, of the two algorithms supported by the IPSec protocol, HMAC-SHA1-96 is about twenty-five percent slower".

Signed and Sealed this

Twenty-ninth Day of April, 2008

JON W. DUDAS
*Director of the United States Patent and Trademark Office*